Feb. 25, 1930.    B. J. HASKINS    1,748,417
MECHANISM FOR TESTING IGNITION OF AUTOMOBILES
Filed Feb. 18, 1928    2 Sheets-Sheet 1
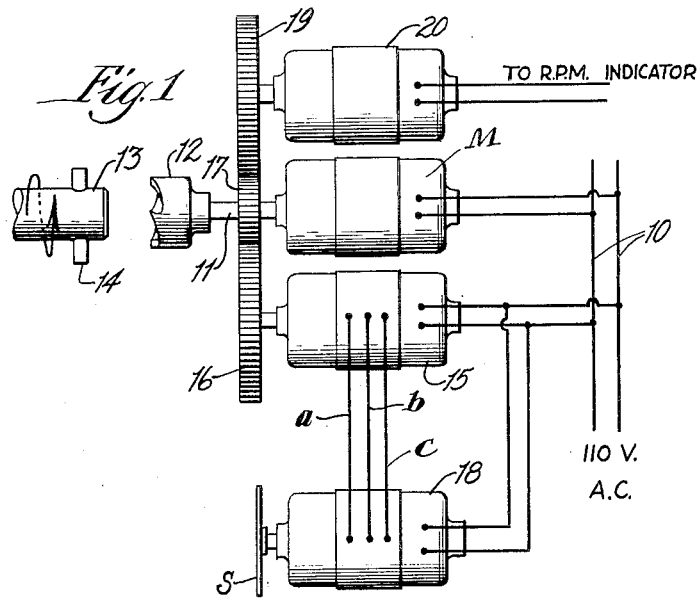
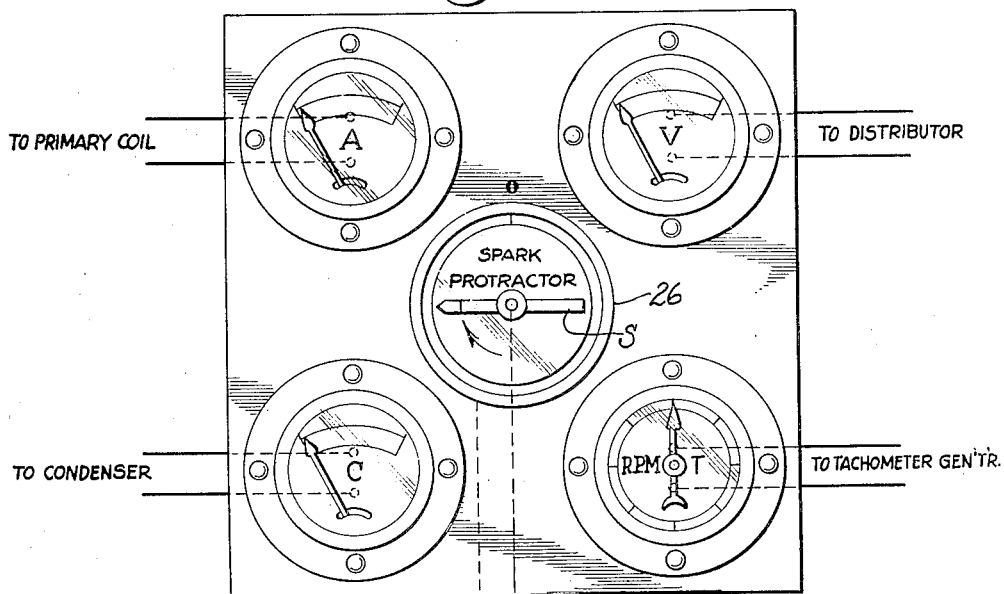

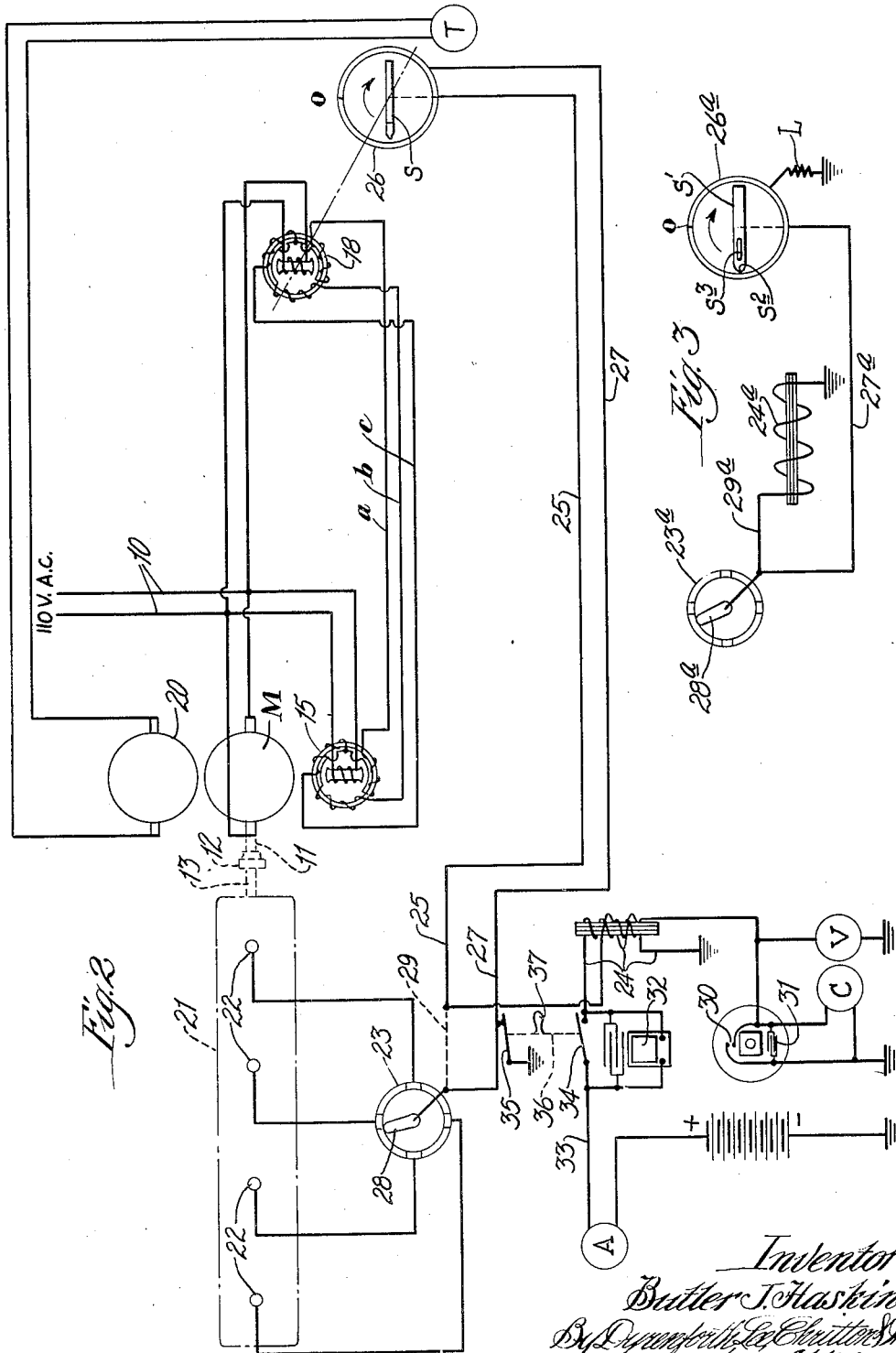

Patented Feb. 25, 1930

1,748,417

UNITED STATES PATENT OFFICE

BUTLER J. HASKINS, OF CHICAGO, ILLINOIS, ASSIGNOR TO JOSEPH WEIDENHOFF, INCORPORATED, A CORPORATION OF ILLINOIS

MECHANISM FOR TESTING IGNITION OF AUTOMOBILES

Application filed February 18, 1928. Serial No. 255,387. REISSUED

This invention relates to mechanism for testing the ignition of automobiles and the like and is fully described in the following specification and shown in the accompanying drawings, in which:

Figure 1 is a diagrammatic view of the various generators and motors and their relation to each other;

Fig. 2 is a combined wiring diagram and diagrammatic view of the mechanism as a whole and of the ignition circuit of an automobile engine;

Fig. 3 is a partial view of the same showing modified form of spark protractor; and Fig. 4 is a front elevation of the instrument board of the tester.

The invention consists essentially of a spark protractor indicator S which is driven at the same speed as the distributor shaft of the automobile and in exact synchronism therewith together with means for registering on this spark protractor indicator the spark of each spark plug as it occurs. This indicator, as will hereinafter appear show not only the position of each spark for any given speed but also its intensity.

The mechanism for driving the spark protractor will now be described. It consists essentially of a motor M which is driven from a source of alternating current 10 and which has a shaft 11 at the forward end of which is a dental clutch 12 adapted to fit over the end of the engine crank shaft 13, and having ratchet teeth adapted to engage the pins 14 on the engine crank shaft. This motor is not powerful enough to drive the crank shaft of the engine but, when placed in position and started is able to follow the engine's crank shaft at all times so as to be in exact synchronism therewith.

The synchronous generator 15 has a gear 16 which meshes with a pinion 17 on the motor shaft 11 and is driven at one-half the speed of the motor M. It is electrically connected by means of three wires $a$, $b$, $c$ with a synchronous motor 18, the generator 15 and the motor 18 being connected to the same alternating current circuit 10 as shown in Figs. 1 and 2. The synchronous motor 18 has the spark protractor indicator S mounted on its shaft by fractional means so that the indicator S can be turned to adjust it to zero position as will later be described.

The pinion 17 is also meshed with a gear 19 on the tachometer generator 20 and this is connected through suitable wiring to the tachometer indicator T on the instrument board (Fig. 4). This tachometer is graduated to read the speed of the engine in revolutions per minute of the engine crank shaft.

The engine block 21 is shown as provided with four spark plugs 22 which are supplied with the necessary high tension voltage through a distributor 23 which is driven at one-half the engine speed as is customary in automobile engines. This distributor is connected to the secondary coil 24 while the opposite end of this coil is connected to ground as indicated.

Where this testing mechanism can be set up near the front of the automobile so that the leads from the high tension coils 24 to the spark protractor S are quite short, the wiring is done as indicated in Fig. 2. A high tension lead 25 connects the end of the high tension coil 24 with the protractor pointer S which for this purpose is of metal and separated by an air gap of about one thirty second of an inch from the metal ring 26 which forms a housing for the indicator S, said housing being connected through a high tension lead 27 with the distributor finger 28. It is possible to thus pass the high tension current directly through the spark protractor where the protractor is located quite close to the engine so that the high tension leads 25, 27 are quite short.

Thus it will be seen that each time a spark occurs at one of the spark plugs 22, a spark simultaneously occurs between the end of the metal pointer S and the metal ring 26 and that, for any given setting of the spark advance of the distributor 23 and of the pointer S on its shaft, the spark occurring between the pointer S and the ring 26 corresponding to any one of the spark plugs 22 will always occur at the same point on the ring 26. In other words the four sparks between the pointer S and the ring 26 will be separated by 90° from each other.

In setting this apparatus the motor M and generators 15 and 20 are mounted on a frame which is adapted to be placed inside the front bumper and between the front fenders with the shaft 11 extending through the opening which is provided in all automobiles for the insertion of a hand crank. With the parts so placed, the engine having been originally turned over by hand until the desired pistons are at the top of their stroke. The finger S is then turned so that it is exactly over the zero mark at the top of the ring 26 when the motor M is in operative position upon the crank shaft 13. If now a scale is provided which reads in a clockwise direction from zero to 360° and as the engine is now started and operated in the usual way, the sparks previously described will occur at the end of the pointer S and the location of these sparks with relation to the position of the distributor finger 28 will be shown inside the ring 26. From this a very simple computation will enable the operator to tell just how many degrees ahead of dead center the spark occurs for each cylinder under any given set of operating conditions.

It will be understood that during all of this time the engine operates exactly as it does under any other idling or block test and that the speed of the engine is always under the control of the throttle and that the distributor 23 is always under the control of the spark advance lever. Advancing and retarding the spark advance lever advances or retards the position of the jump spark at the end of the pointer S. The usual lead 29 is open during this test.

The spark is caused by the usual breaker points which are a part of the distributor and are shown at 30 with the usual condenser 31 for absorbing the spark of the primary winding.

When the engine is thus operated at fairly high speed, the spark of each cylinder occurs each time at exactly the same point and these sparks, at high speed, occur so rapidly as to appear to the eye to be practically continuous. Thus a visual comparison is readily possible between the sparks of the various cylinders, and an operator accustomed to this mechanism can readily tell at a glance how each spark plug is actually performing and he can also tell whether each cylinder is getting its proper amount of charge, whether leakage past the piston ring is occurring and numerous other data of this nature.

I have also provided a means of visually examining the extent and duration of closing of the breaker points. This consists of a master vibrator 32 placed in the primary lead 33 which is interrupted by a switch 34 which is normally closed except for this test. A switch blade 35 is adapted to make contact with the high tension lead 27 between the spark protractor S and the distributor 23 and to thus ground the lead 27. The switch blades 34 and 35 are connected by an insulating bar 36 and controlled by a single handle 37. The switch 35 however must close before the switch 34 opens.

With the engine in operation and the parts in the positions shown in Fig. 2, the operator has thrown the switch handle 37 so as to close the switch 35 and open switch 34 thereby causing a series of impulses to surge through the primary coil and produces a shower of sparks at the end of the spark protractor as long as the breaker points 30 are closed. Thus the operator can read the position of the opening and closing of these breaker points in degrees of arc on the distributor for each cylinder. The operator leaves the switch 34 open only long enough to make the observation and then closes this switch again before the engine stops. The engine is running on its own momentum while the switch 34 is open.

In Fig. 3 is shown a modified form of the device. In this the distributor $23^a$ is left connected directly to the high tension winding $24^a$, but a lead $27^a$ is taken from the distributor finger $28^a$ to the metal ring $26^a$. Within this metal ring is mounted a finger $S^1$ which is driven as before by a synchronous generator motor arrangement as 15, 18 shown in Fig. 2. All of the other elements of Fig. 2 may be deemed to be repeated in Fig. 3 but these are not shown therein for the sake of clearness. Their repetition appears to be needless. The lead $29^a$ is closed in this circuit.

In Fig. 3 the pointer $S^1$ is of the neon pencil type in which there is a small glass tube almost completely exhausted but containing a very small amount perhaps a millionth of atmosphere of neon gas. This pencil has a small metal tip $S^2$ connected to the end of this neon tube so that when a high tension charge is applied to the metal ring $26^a$ this charge will cause the neon or other gas in the tube to flow with a color depending on the gas in the tube and this will show through a small window $S^3$ in the front of the tube.

This glowing of the neon gas is momentary and occurs at exactly the same instant that the spark occurs. Thus as the pencil $S^1$ is rotated the glow corresponds to the spark of any one cylinder and always occurs in exactly the same place in the rotation for any given set of operating conditions. With the engine speeded up, the glowing of this gas will occur so rapidly at the position of sparking of each cylinder as to make it appear to the eye of the observer that the sparking for any given cylinder persists. In this way the observer can, with a little practice, tell what the conditions of the spark and of the spark or of any given cylinder as the spark of that cylinder always occurs at exactly the same place. Thus, for a four cylinder engine as illustrated these sparks will occur 90° apart and will be advanced or retarded.

The arrangement shown in Fig. 3 permits the instrument board shown in Fig. 4 to be carried somewhat further away from the engine than is possible with the arrangement shown in Fig. 2. It will be observed that in Fig. 3 the high tension lead from the high tension coil of the distributor is not open, but that the lead 27ª is connected thereto only at one point.

The tachometer T on the instrument board (Fig. 4) shows the speed of the engine. The ammeter A on the instrument board of Fig. 4 reads the amperage draw of the primary of the coil and the position of the ammeter in the circuit is indicated at A of Fig. 2. Likewise the voltmeter on the instrument board (Fig. 4) shows the voltage across the primary of the induction coil, its position in circuit is indicated in Fig. 2. The capacity meter C of the instrument board (Fig. 4) is connected across the two sets of plates of the condenser of Fig. 2 where its position in the wiring diagram is indicated by the letter C.

If a charge tends to build up on the ring 26ª (Fig. 3), a high resistance leak L to ground may be used. This may be fixed or variable.

A single phase alternating current synchronous motor layout is shown herein but this has the disadvantage that the motor has a small "hunting" action. This could be almost completely eliminated by using polyphase alternating current to drive the motors and generator.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. An ignition testing machine for automobile engines comprising a lay shaft operatively connected to run at the speed of one of the engine shafts, a spark protractor connected to said lay shaft and rotating in timed relation to the automobile distributor shaft, and means for indicating on said protractor each spark as it passes the distributor.

2. An ignition testing machine for automobile engines comprising a lay shaft operatively connected to run at the speed of the engine crank-shaft, a spark protractor connected to said lay shaft and rotating in timed relation to the automobile distributor shaft, and means for indicating on said protractor each spark as it passes the distributor.

3. In combination, an internal combustion engine having a jump-spark ignition, means associated with the jump-spark mechanism for indicating the character of each jump-spark, and means in synchronism with the driving means for propelling the spark indicating means.

4. An ignition testing machine for automobile engines in which the primary circuit of the spark coil is made and broken only once for each spark, comprising an indicator adapted to be associated with the high tension ignition circuit of the automobile, and means for intermittently exciting the primary winding of the spark coil to cause said indicator to indicate the period during which the breaker points of the distributor are closed for any given cylinder.

5. An ignition testing machine for automobile engines comprising a spark protractor adapted to move in timed relation to the distributor shaft of the engine and adapted to be associated with the high tension ignition circuit of the automobile, and means for intermittently exciting the primary winding of the spark coil to cause said protractor to indicate the period during which the breaker points of the distributor are closed for any given cylinder.

6. An ignition testing machine for automobile engines comprising an indicator adapted to be associated with the high tension ignition circuit of the automobile, and means for intermittently exciting the primary winding of the spark coil to cause said indicator to indicate the period during which the breaker points of the distributor are closed for any given cylinder, said indicator serving also to indicate the intensity and duration of the engine spark for said cylinder when the engine is running and the exciting means is not in operation.

In testimony whereof, I have hereunto set my hand and seal this 10th day of February, 1928.

BUTLER J. HASKINS.